United States Patent [19]

Van Antwerp et al.

[11] Patent Number: 4,737,710

[45] Date of Patent: Apr. 12, 1988

[54] HALL-EFFECT ARRAY FOR SENSING SECOND SPATIAL DERIVATIVE OF MAGNETIC FIELD

[75] Inventors: Joel C. Van Antwerp, Frisco; Larry L. Harris, Coppell, both of Tex.

[73] Assignee: TRW Inc., Redondo Beach, Calif.

[21] Appl. No.: 849,364

[22] Filed: Apr. 8, 1986

Related U.S. Application Data

[63] Continuation of Ser. No. 461,587, Jan. 27, 1983, abandoned.

[51] Int. Cl.$^4$ .................. G01B 7/14; H01L 43/06; H03K 17/90; H03K 19/18
[52] U.S. Cl. .................. 324/208; 324/251; 307/309; 338/32 H
[58] Field of Search .................. 324/207, 208, 251; 338/32 H; 307/309

[56] References Cited

U.S. PATENT DOCUMENTS

| | | | |
|---|---|---|---|
| 3,243,692 | 3/1966 | Heissmeier et al. | 324/208 |
| 3,329,833 | 7/1967 | Dorsch | 324/251 |
| 3,923,030 | 12/1975 | Luteran | 307/309 |
| 3,956,618 | 5/1976 | Götz | 324/207 |
| 4,443,716 | 4/1984 | Avery | 307/309 |

Primary Examiner—Reinhard J. Eisenzopf
Assistant Examiner—Walter E. Snow
Attorney, Agent, or Firm—Noel F. Heal; Sol L. Goldstein; Robert J. Stern

[57] ABSTRACT

Hall-effect position sensor apparatus is disclosed which senses the position of a moving body and provides an output signal indicative of the position of the moving body. The apparatus includes a predetermined number of Hall-effect sensors which are positioned in a straight line and in operating proximity to a moving body made of a ferromagnetic material. A permanent magnet is operatively positioned such that the Hall-effect sensors lie in the magnetic field produced by the magnet while the moving body provides a portion of the path comprising the magnetic excitation circuit with the permanent magnet. The moving body includes portions devoid of ferromagnetic material, which causes a change in the magnetic field. The Hall-effect sensors sense the absolute value of the magnetic field and because of their particular physical alignment and separation, together with the unique interconnection of their individual electrical outputs, provide signals to amplifier devices which represent the second time derivatives of the magnetic field sensed by the Hall-effect sensors. The electrical outputs of the amplifier devices are provided to a Schmitt trigger comparator which performs the analog to digital conversion of the input signals and provides a digital logic output signal which provides a reference point with respect to the location on the moving body, of the void which causes the change in the magnetic field.

41 Claims, 7 Drawing Sheets

HALL-EFFECT ARRAY FOR SENSING SECOND SPATIAL DERIVATIVE OF MAGNETIC FIELD

This application is a continuation of application Ser. No. 461,587, filed Jan. 27, 1983, now abandoned.

1. Field of the Invention

The present invention relates in general to Hall-effect devices, and more particularly to a Hall-effect device as used to sense the position of a moving object and provide an indication of the position or displacement of the object.

Although the present invention is applicable for numerous sensing and indicating functions, it has been found to be particularly useful in the sensing and providing an indiation of the rotational position of a rotating member as employed in various types of machines. Therefore, without limiting the applicability of the invention to "rotating members", the invention will be described in this environment.

2. Description of the Prior Art

It is well known that when a current flows in a Hall-effect device and a magnetic field is applied at right angles to the current flow, an electrical potential is generated which is perpendicular to both the direction of current flow and the magnetic field. This potential appears between points that were at equal electrical potential in the absence of the magnetic field. This potential may be measured by any type of instrument which will respond to changes in potential at these fairly low values. This potential, which is known as the Hall potential, is proportional to both the electric current and the magnetic field. Therefore, if the electric current is kept constant and the magnetic field is varied, the Hall potential will vary in accordance with the strength of the magnetic field.

Devices for detecting the position or displacement of an object are already known. For example, U.S. Pat. No. 2,987,669 discloses a Hall-effect sensing apparatus in which two Hall-effect devices are positioned in a side-by-side relationship between the poles of a permanent horseshoe magnet. The output terminals of the Hall-effect devices are connected in series opposition. A movable flat plate of soft iron is positioned between the Hall-effect devices and a pole piece of the magnet. The body whose position is to be sensed is attached to the movable flat plate for movement therewith. A pair of stationary flat plates of soft iron are positioned in alignment with the Hall-effect devices and between the Hall-effect devices and the movable flat plate. The output of the Hall-effect devices provides a null position indication.

U.S. Pat. No. 4,086,533 discloses a Hall-effect device for determining the angular position of a rotating part and includes first and second parallel arranged magnets forming a symmetric magnetic excitation circuit with a Hall-effect element disposed on the axis thereof. The rotating part has first and second elements made of a soft magnetic material which are angularly displaced so as to alternately pass by the first and second magnets, respectively, to produce first and second oppositely directed transverse magnetic field components, H, at the Hall-effect element which thereby generates a signal whose polarity reverses to indicate angular position of the rotating part.

The present invention provides a solution to various deficiencies of the prior art devices using electrical differentiation of the signal since this type of prior art device amplifies the high frequency noise and thereby greatly reduces the signal-to-noise ratio of the resultant signal. In addition, this type of prior art device requires high values of capacitance in the circuitry in order to obtain low frequency performance. When an attempt is made to use the circuitry at high frequencies, excessive currents are generated in the circuit which causes the amplifiers to saturate and causes power dissipation problems in the circuitry. In the variable reluctance prior art devices, with respect to movement of a rotating body, the level or value of the output is proportional to rpm; therefore, the higher the rpm, the higher the output signal from the device. In addition, shielding is required of the signal leads in order to obtain a usable signal because of the very low level of the output signal at low rpm. An additional deficiency in this prior art device is the requirement for a great amount of signal conditioning in order to obtain a usable output signal.

SUMMARY OF THE INVENTION

The present invention provides apparatus for sensing the position of a rotating member and providing an output signal indicative of the position or displacement of the rotating member. The apparatus includes a predetermined number of Hall-effect devices or sensors positioned in a straight line and positioned in operating proximity to a rotating member made of a ferromagnetic material. A permanent magnet is operatively positioned such that the Hall-effect devices lie in the magnetic field produced by the magnet and the rotating member provides a portion of the path comprising the magnetic excitation circuit with the permanent magnet. Means are provided on the rotating member for causing a change in the magnetic field or magnetic flux density to which the Hall-effect devices are subjected when the member is rotated past the Halleffect devices. The Hall-effect devices sense the change in the magnetic field or magnetic flux density to which they are subjected and, because of their particular physical alignment and separation together with the unique interconnection of their individual electrical outputs, provide signals to an amplifying means which represent the second derivative of the magnetic field, with respect to the distance traveled by the rotating member, sensed by the Hall-effect devices. The electrical output of the amplifying means is provided to a Schmitt trigger comparator which performs an analog-to-digital conversion of the input signal and provides a digital output signal which provides a reference point or location with respect to the location on the rotating member of the means for causing a change in the magnetic field.

Among the advantages offered by the present invention is a less complicated design of greater accuracy and reliability with fewer number of parts or elements. The present invention is more economical to manufacture. The amplitude of the output signal of the present invention does not vary with the speed of the sensed object. The present invention can accurately sense from very high rpm down to and including zero rpm. Additional elements need not be attached to the body to be sensed. The present invention requires only one permanent magnet.

Examples of the more important features of this invention have thus been summarized rather broadly in order that the detailed description thereof that follows may be better understood and in order that the contribution to the art may be better appreciated. There are, of course, additional features of the invention that will be described hereinafter and which will also form the subject of the claims appended hereto. Other features of the present invention will become apparent with reference to the following detailed description of a presently preferred embodiment thereof in connection with the accompanying drawing, wherein like reference numerals have been applied to like elements in which:

BRIEF DESCRIPTION OF THE DRAWING

FIG. 4 is a simplfied schematic of the present invention;

DESCRIPTION OF THE PREFERRED EMBODIMENT

Figure 1:
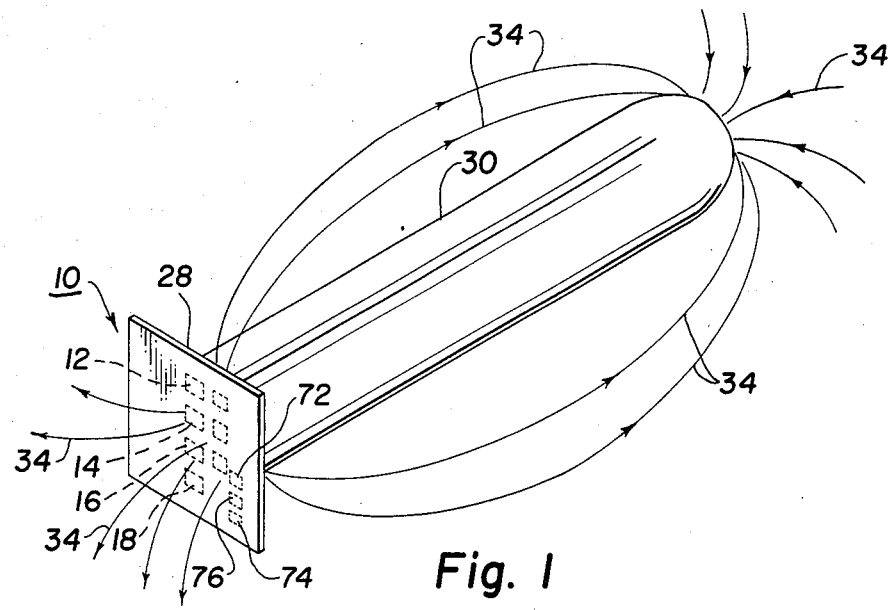
FIG. 1 is a simplfied perspective of an embodiment of the present invention positioned in operative relationship with a magnet.

Referring now to the drawing and in particular to FIGS. 1-4, Hall-effect apparatus according to the present invention is generally referred to by reference numeral 10. The Hall-effect apparatus 10 comprises a multiple predetermined number of Hall-effect devices or sensors, which in the disclosed embodiment comprises four Hall-effect devices or sensors, namely first Hall-effect device 12, second Hall-effect device 14, third Hall-effect device 16 and fourth Hall-effect device 18. Further included in the Hall-effect apparatus 10 is a transconductance amplifier 17, a transimpedance amplifier 19, a low-pass feedback amplifier 20, a comparator 22, an output driver 24 and a voltage regulator 26. The Hall-effect apparatus 10 is configured as an integrated circuit implemented on a linear bipolar silicon chip 28 to assure that the Hall-effect devices 12-18 will be well matched in sensitivity, able to withstand harsh environmental conditions, reliable, inexpensive, small, etc.

Figure 2:
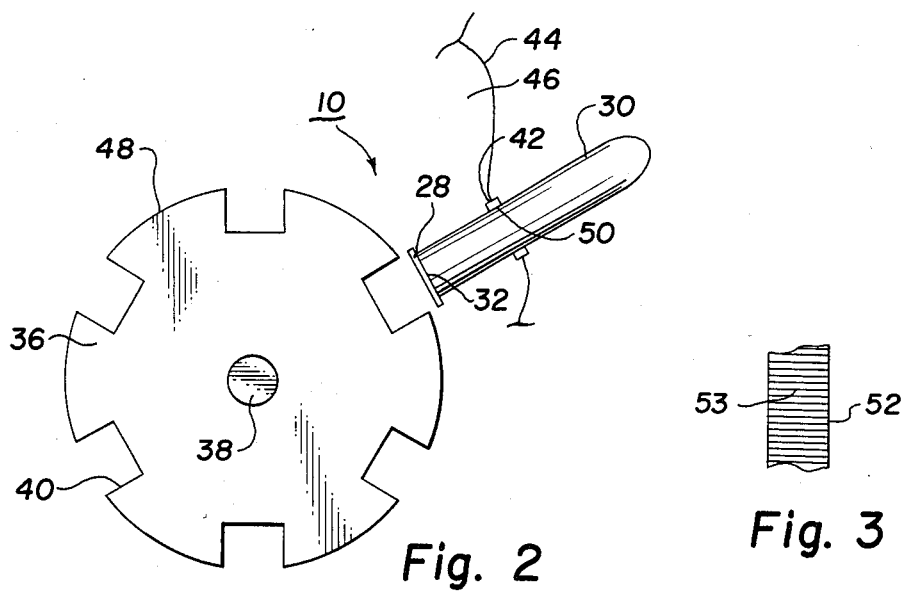
FIG. 2 is a simplified side elevational view of the present invention as positioned to provide an output signal indicative of the rotational position of a notched rotating member.

The four Hall-effect devices 12-18 are laid out or situated in a straight line on the silicon chip 28. The silicon chip 28 is attached to the end of elongated permanent bar magnet 30 by fastening means 32. In the preferred embodiment, fastening means 32 comprises a suitable heat resistive adhesive, epoxy, etc., but could include other mechanisms adapted to attach chip 28 to the end of bar magnet 30. As an alternative, the IC chip 28 can be packaged in a plastic dual-in-line package (DIP). Normally it is desirable to have the Hall-effect devices 12-18 as close to the object being sensed as is possible. The silicon chip 28 is attached to the end of elongated permanent bar magnet 30 to increase the ease of positioning and handling the Hall-effect apparatus 10 during a sensing operation and to insure that the Hall-effect devices 12-18 are positioned such as to be subjected to a maximum and equal value of magnetic flux density of magnetic flux 34 from magnet 30 during corresponding position relative to a predetermined portion or section of the rotating object, disk or gear 36 as the disk or gear 36 rotates. The Hall-effect devices 12-18 are normally positioned to lie within an area described by the periphery of the end of the bar magnet 30 although the two end Hall-effect devices 12 and 18 could be positioned past or partially past the periphery of the end of bar magnet for a special application, etc. The distances or spacings between the Hall-effect devices 12-18 are important and the determined value is really a trade off between the value of signal level output from the Hall-effect devices and the resolution thereof. The distances or spacings of concern are those between Hall-effect devices 12 and 16 and Hall-effect devices 14 and 18. With reference to the configuration as shown in FIG. 2, the further apart that Hall-effect devices 12 and 16 and Hall-effect devices 14 and 18 are located (within limits), the greater in magnitude or value is the analog signal output therefrom but the resolution of the signal is decreased. Conversely, the closer together the Hall-effect devices 12 and 16 and the Hall-effect devices 14 and 18 are located, the greater the resolution of the signal but there is an accompanying decrease in the magnitude of the signal output from the Hall-effect devices. For the configuration as shown in FIG. 2, the range of acceptable distance or spacing between the Hall-effect devices, 12 and 16 and between devices 14 and 18 is from about twenty-five to about eighty mils (0.025 to 0.080 inches) with the optimum spacing being about sixty mils for the disclosed embodiment.

Bar magnet 30 is magnetized in the longitudinal direction and may have numerous cross-sectional shapes such as square, round, rectangular, etc. The material of bar magnet 30 should be Alnico 5 or equivalent to provide a satisfactory magnetic flux for best overall performance of the Hall-effect apparatus 10. It will be appreciated that the permanent magnet 30 could be replaced with any means which would provide the necessary magnetic flux or field, such as an electromagnet.

With reference to FIG. 2, the Hall-effect apparatus 10 is disclosed in an exemplary detecting or sensing application in an automobile engine. A thin circular plate, disk or gear 36 is attached to the crankshaft 38 of the automobile engine for rotation therewith. Multiple notches 40 are formed in the periphery of disk 36 with a known relationship between the position of the notches 40 and the position of the pistons, valves, etc., during the rotation of the crankshaft 38. By determining the position of the notches 40 during the revolution of the crankshaft 38 this position information may be used, for example, by an electronic ignition system to fire the spark plugs at the correct time when the crankshaft is at a predetermined point in its rotation. The material of the disk 36 should be a ferromagnetic material. The end of bar magnet 30, to which the chip 28 is attached, is inserted through aperture 42 (in the engine wall 44) into the crankshaft area 46 until the Hall-effect devices 12-18 are within ten to seventy-five mils of the solid portion 48 (between notches 40) of the periphery of disk 36. It will be appreciated that the silicon chip 28 is flat and the periphery of disk 36 is curved. The distance occupied by Hall-effect sensors 12-18 on chip 28 is so small or short and the amount of curvature of the periphery of disk 36 is so slight over that small distance, that the operation of the Hall-effect position sensor apparatus 10 is not operatively affected thereby. Chip 28 is aligned relative to disk 36 such that Hall-effect devices 12-18 lie in the plane formed by disk 36 and on the centerline of the thickness of the disk 36 as measured perpendicular to the plane of FIG. 2. Fastening means 50 attaches the bar magnet 30, together with silicon chip 28, in the selected operational position. Fastening means 50 may be a clamp or other conventional fastening or attaching mechanisms. It will be appreciated that disk 36 could be attached to the end of the crankshaft 38, near the harmonic balancer, outside the crankcase area 46 and the bar magnet 30 and Hall-effect apparatus 10 attached in operative position outside the crankcase area 46 by an appropriate standoff from the engine.

Figure 3:
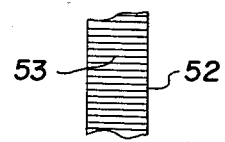
FIG. 3 is a simplified partial and elevational view of a gear whose rotational position may be sensed by the present invention.

With reference to FIG. 3, another detecting or sensing application for the Hall-effect apparatus 10, relative to the automobile, is the sensing and indicating of the position of the teeth 53 of a transmission gear 52 in an automobile transmission. The bar magnet 30 with attached chip 28 is positioned into and through the side of the transmission case in a manner similar to the mounting as shown in FIG. 2 but being positioned to sense the teeth 53 of the transmission gear 52. By taking the rotational position information of the transmission gear 52, microprocessor means may differentiate the rotational position information to determine the rotational velocity of the gear 52 and use that velocity in the electronic shifting of the transmission for greater efficiency of the transmission.

With reference to FIGS. 2 and 4-8, a simplified schematic of the present invention together with the appropriate signal waveforms are shown. As shown in FIG. 4, the plus and minus terminals of the Hall-effect devices 12-18 are connected in a unique and interdigited-type or cross-coupled manner with the resulting plus and minus signals being applied to respective plus and minus terminals of transconductance amplifier 17 via leads 60 and 62, respectively. For a voltage signal into the transconductance amplifier 17, a current signal is provided as an output. The single-ended output signal of the transconductance amplifier 17 is provided as an input to a transimpedance amplifier 19 via lead 64. For a current signal into the transimpedance amplifier 19, a voltage signal is provided as an output. The single-ended output signal of the transimpedance amplifier 19 is provided as one input to a Schmitt trigger comparator 22 via lead 66 and as one input to low-pass feedback amplifier 20 via lead 63. The single-ended output of low-pass feedback amplifier 20 is fed back to the input of the transimpedance amplifier 19 via resistor 61. (As an alternative embodiment, the single-ended output of low-pass feedback amplifier 20 is fed to the positive input (lead 60) of the transconductance amplifier 17 via resistor 61 instead of being fed back to the input of the transimpedance amplifier 19.) The output of the transimpedance amplifier 19 is also fed back to the input of the transimpedance amplifier 19 via resistor 65 which sets the gain of the transimpedance amplifier 19. Both the transconductance amplifier 17 and the transimpedance amplifier 19 are temperature compensated so their function is generally constant over the normal operating range of temperature. This compensation is provided in transimpedance amplifier 19 by forming resistor 65 from the same epi material as used in the Hall-effect devices 12-18. The reference voltage for the Schmitt trigger comparator 22 and the low-pass feedback amplifier 20 is supplied to terminal 25 and then to the negative input terminal of the low-pass feedback amplifier 20 via lead 27 and also to the positive input terminal of the Schmitt trigger comparator 22 via resistor 29. The reference voltage is equal to two diode voltage drops or two $V_{BE}$'Ws and the operating voltage of the transimpedance amplifer 19 operates around the two $V_{BE}$ bias voltage. The low-pass feedback amplifier 20 senses the output signal of the transimpedance amplifier 19 on lead 63 and compares it to the reference voltage input on terminal 25. If there is a difference, feedback amplifier 20 generates an error signal which is fed back into the input of the transimpedance amplifier 19 to correct for low frequency offsets which are basically DC-type offsets. The correction provided by feedback amplifier 20 compensates for all offsets in both the Hall-effect devices 12-18, the transconductance amplifier 17 and the transimpedance amplifier 19. The correction also compensates for any offset due to temperature since any offset due to temperature will change very slowly. In effect, the low-pass feedback amplifier 20 compensates the transimpedance amplifier 19 over a range of very low frequencies such that the transimpedance amplifier 19 maintains the same output voltage as the value of the reference voltage on the Schmitt trigger comparator 22 and the feedback amplifier 20. Comparator 22 is designed to incorporate hysteresis to assure good noise margin. The logic signal output of comparator 22 is input to output driver 24 via lead 68 where the signal is amplified and applied to output terminal 72 via lead 70. The output signal or terminal 72 is then available for use as desired and is a digital profile of the notches 40. $V_{cc}$, applied to terminal 74 as the input voltage to the voltage regulator 26, may vary from plus 4.5 volts to plus twenty-four volts with the output voltage $V_R$ of the voltage regulator 26, for the disclosed embodiment, remaining at 3.3 volts. Ground is applied to terminal 76.

Figure 5:
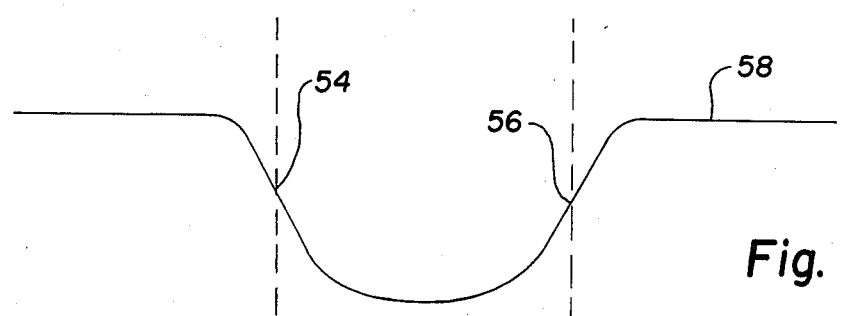
FIG. 5 is a simplified waveform diagram of the magnetic flux density presented to the present invention as arranged in FIG. 2.

With reference to FIGS. 1 and 2, during the rotation or passing of the solid portion 48 of disk 36 past the Hall-effect devices 12-18, the magnitude of the magnetic flux 34 to which the Hall-effect devices 12-18 are subjected is essentially constant in value. As a notch 40 passes the Hall-effect devices 12-18, the magnitude of the magnetic flux density 58 decreases as depicted in FIG. 5 since the reluctance of the magnetic circuit is increased by the presence of the air gap of notch 40. The minimum amount of change of magnitude of the magnetic flux density over a given distance (magnetic field gradient) which is acceptable for proper operation of the Hall-effect apparatus 10 is approximately 10 gauss/100 mils. Inflection points 54 and 56 of the magnetic flux density curve 58 do not change with reasonable changes (±20 mils) in the air gap distance between the Hall-effect devices 12-18 and the solid portion 48 of disk 36 even though the magnitude of the magnetic flux density may change.

The resultant output voltages from the plus and minus terminals of the devices 12-18, as shown in FIG. 4, are applied as inputs to transconductance amplifier 17 via leads 60 and 62. The typical output voltage level of the Hall-effect devices 12-~ is two millivolts/100 gauss of change of the magnetic flux density. The resultant voltage appearing on lead 60 is the algebraic sum of the voltages from predetermined terminals of the Hall-effect devices 12-~ and is equal to Equation #1: +Hall #1 − Hall #2 − Hall #3 + Hall #4.

The resultant voltage appearing on lead 62 is equal to

Equation #2: −Hall #1 + Hall #2 + Hall #3 − Hall #4.

Figure 6:
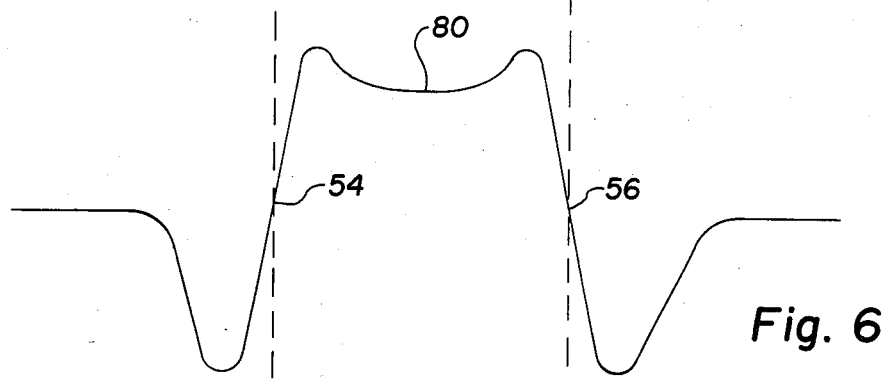
FIG. 6 is a simplified waveform diagram of the resultant positive output signal from the Hall-effect devices of FIG. 4.
Figure 7:
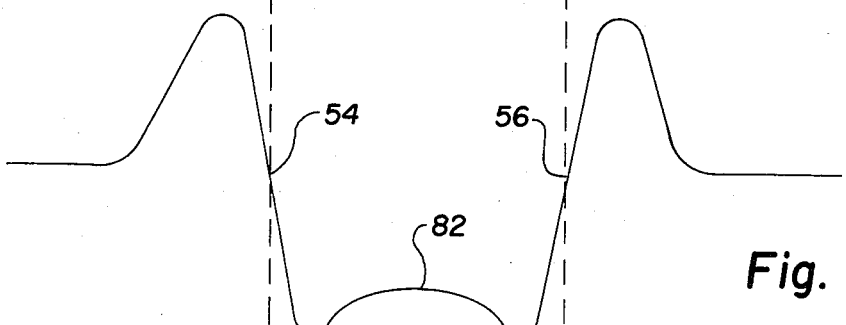
FIG. 7 is a simplified waveform diagram of the resultant negative output signal from the Hall-effect devices of FIG. 4.

Each Hall-effect device 12-~ senses the absolute value of the component of the magnetic field which is perpendicular to the plane of the Hall-effect device. As a notch 40 in disk 36 rotates through or past the area of the apparatus 10, the output of the Hall-effect device 14 lags in time the output of Hall-effect device 12. The amount of time by which the output of device 14 lags the output of device 12 is equal to the distance between devices 12 and 14 divided by the peripheral surface velocity of rotating disk 36. Likewise, the output of Hall-effect device 16 lags in time the output of Hall-effect device 14 and the output of Hall-effect device 18 lags in time the output of Hall-effect device 16. Combining the individual device's signal output, as described by equations #1 and #2, results in plus and minus signals 80 and 82 which are the second derivatives of the associated magnetic field and are depicted in FIGS. 6 and 7, respectively. FIG. 6 depicts the signal on line 60 and FIG. 7 depicts the signal on line 62. This unique mannre in which the Hall-effect devices 12-~ are physically arranged and interconnected eliminates any signal, in the resultant output signal, which is generated by the uniform DC bias magnetic field. Therefore, if the magnetic flux density is uniform, the output of the Hall-effect apparatus 10 will be zero. A non-zero output of the Hall-effect apparatus 10 indicates a non-uniformity in the magnetic flux density to which the Hall-effect sensors 12-~ are subjected.

Figure 8:
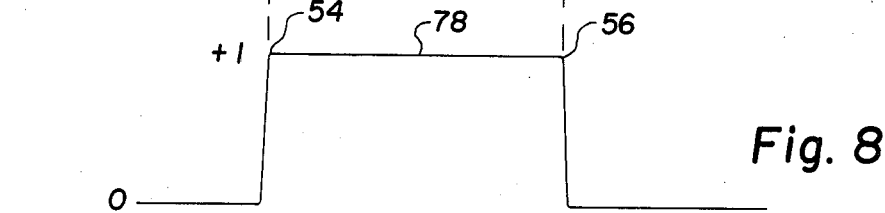
FIG. 8 is a simplified waveform diagram of the output signal from the circuitry of FIG. 4.

The output signal of transconductance amplifier 17 is input to a Schmitt trigger comparator 22 via lead 66. Comparator 22 is really detecting the zero crossing of the second time derivative signal input and the analog-to-digital conversion occurs in comparator 22. The digital output signal 78 from comparator 22 is depicted in FIG. 8 and is input to output driver 24 via lead 68. Output driver 24 amplifies the input signal and provides the amplifier signal to output terminal 72 for further distribution and use. The digital output signal 78 provides a reference point or location with respect to the edge of the notch and the reference point will not change for a given application.

There are two distinct advantages to using the second derivative signal derived from the change in the magnetic field over using the first derivative. The first advantage is that the resultant signal level is twice the value of the first derivative signal level and is obtained without amplifying any signals. The first derivative is the slope of the signal waveform and is obtained by the use of two Hall-effect devices. The second derivative is the change in the slope of the signal waveform and is obtained by the use of more than two Hall-effect devices; therefore, the resultant signal level is twice the value of the first derivative signal level just by having the information from the other Hall-effect device or devices. This doubling of the signal level is evident from looking at the second derivative equation.

The second advantage is that the inflection point of the magnetic field changes very little with large changes of air gap between the sensor apparatus 10 and the ferromagnetic object whose position is being sensed. The zero-crossing of the second derivative corresponds with the inflection point of the magnetic field, whereas the peaks of the first derivative corresponds with the inflection point of the magnetic field. Furthermore, the location of the peaks of the 1st derivative and the zero-crossing of the 2nd derivative is affected very little by the sensitivity mismatches of the Hall devices and the spacing of the devices (as long as the device spacing on the 1st derivative circuit is smaller than one-half the width of the notch, gear tooth, or bump being sensed and the average device spacing on the 2nd derivative circuit is smaller than one-fourth the width of the notch, gear tooth or bump being sensed). The reason the zero-crossing of the 1st derivative is not very advantageous to use is that the zero-crossing will change substantially with change in air gap if the device spacings are not very close to one-half the width of the notch, gear tooth or bump being sensed. Furthermore, the location of the zero-crossing of the 1st derivative is greatly affected by sensitivity mismatch of the Hall-devices. This sensitivity mismatch can change with temperature thus causing a zero-crossing drift with temperature. Therefore, to properly use the 1st derivative signal (if the elements are not spaced properly) an analog to digital detector must trip off the peaks of the signal. A "peak-detector" that works over a wide range of operating frequencies and temperatures is a very difficult device to make.

With respect to the waveform of FIGS. 5-8, the inflection points 54 and 56 for the waveforms remain constant even if the amplitude of the waveforms change, the outputs of various elements drift or sensitivity changes, etc. It is desirable to have the second derivative signals 80 and 82 to have the greatest slope possible at the inflection points 54 and 56 to assure the highest accuracy of the Hall-effect apparatus 10. The waveforms of FIGS. 5-8 are plotted as amplitude versus time or distance the disk 36 has traveled. The output levels of Hall-effect sensors 12-~ decrease with an increase in temperature so that transconductance amplifier 17 and transimpedance amplifier 19 will be temperature compensated to offset this decrease in output level from the Hall-effect sensors 12-18.

An alternate embodiment (a d-c coupled version) of the inventive Hall-effect apparatus 10 is obtained by severing the connection (see FIG. 4) between the lower end of resistor 61 and the output of low-pass feedback amplifier 20. The lower or disconnected end of resistor 61 is then connected to a variable-voltage power supply to source or sink current (through resistor 61) at and to lead 64 in order to cancel the offset current out of transconductance amplifier 17. The output of low-pass feedback amplifier 20 could be left floating. This alternate embodiment would allow Hall-effect apparatus 10 to sense zero rpm (or zero linear movement) of the body to be sensed.

Figure 9:
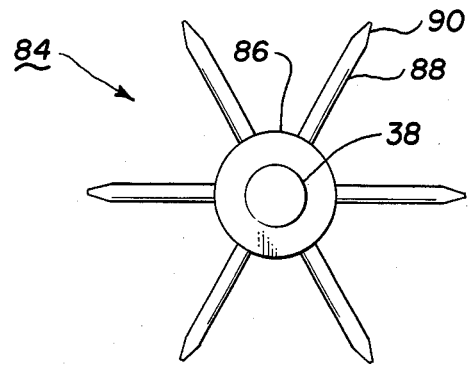
FIG. 9 is a simplified side elevational view of an alternate embodiment of a rotating member used with the present invention.
Figure 14:
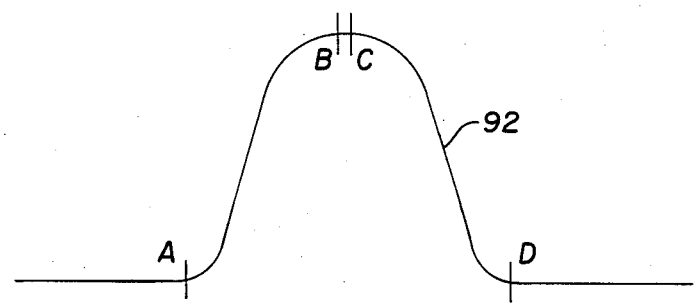
FIG. 14 is a simplified waveform diagram of the magnetic flux density presented to the present invention when used with the rotating member of FIG. 9.

With reference to FIG. 9, a different type of element or device is disclosed for use in crankshaft position sensing instead or in the place of disk 36. Rotating member 84 comprises a hub 86 from which emanates a predetermined number of spikes 88 at predetermined positions or locations. Ends 90 of spikes 88 are tapered inwardly. The overall shape of spikes 88 resembles that of a screwdriver blade. Rotating member 84 is formed of a ferromagnetic material. Hub 86 is positioned on crankshaft 38 for rotation therewith. The Hall-effect apparatus 10 is placed in operative position (similar to FIG. 2) with respect to rotating member 84 and the magnetic field is sensed by Hall-effect apparatus 10. The waveform 92 of the magnetic field as sensed by the Hall-effect apparatus 10 as one spike 88 passes apparatus 10 is disclosed in FIG. 14. It will be appreciated that the change in the magnetic field, as sensed by Hall-effect apparatus 10 in FIG. 2, goes from a maximum value to a lesser value (see FIG. 5) as the notch passes apparatus 10. The change in the magnetic field as sensed by Hall-effect apparatus 10 when used in conjunction with rotating member 84 goes from a very minimum value to the maximum value as a spike 88 passes apparatus 10. The magnitude of the change as depicted in FIG. 14 is greater and the width of the change is less than that in FIG. 5 since the width and depth of the void between spikes 88 is greater than notch 40. The signals from the Hall-effect devices 12-~(the second derivative signals) are similar in shape to those shown in FIGS. 6 and 7 but with reversed polarity.

Figure 10:
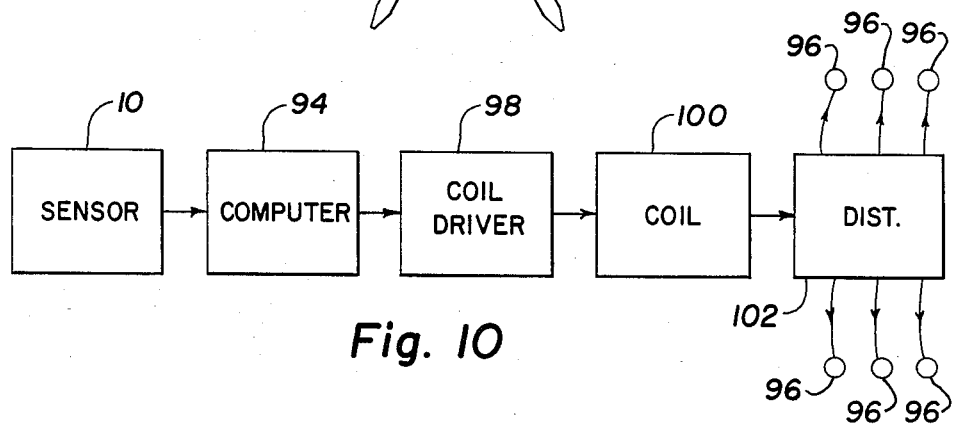
FIG. 10 is simplified block diagram showing the present invention as utilized in the ignition system of an internal combustion engine.

With reference to FIG. 10, a typical use of the Hall-effect apparatus 10 in an internal combustion engine is disclosed. Hall-effect apparatus 10 senses the crankshaft position and provides the information to the vehicle computer 94 which also receives additional information such as amount of intake manifold pressure, engine temperature, throttle position, etc. The computer determines when a particular spark plug 96 should be fired and sends a pulse signal to the coil driver 98 whose output is sent to coil 100. The output of the coil 100 passes through the distributor 102 to the correct spark plug 96.

Figure 15:
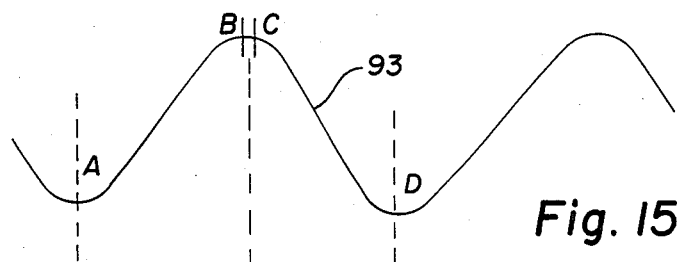
FIG. 15 is a simplified waveform diagram of the magnetic flux density presented to the present invention when used with the gear of FIG. 3.
Figure 16:
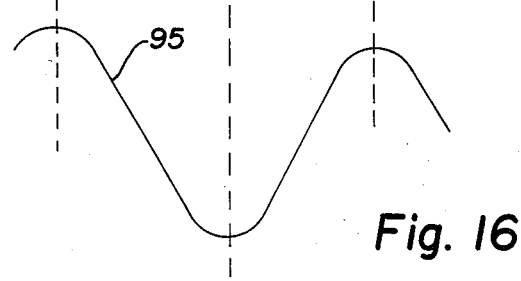
FIG. 16 is a simplified waveform diagram of the resultant positive output signal from the Hall-effect devices of FIG. 4 when used with the gear of FIG. 3.

With reference to FIG. 15, the waveform 93 of the magnetic field as sensed by the Hall-effect apparatus 10, when used in conjunction with transmission gear 52 of FIG. 3, is disclosed. The peaks of the waveform 93 relate to the top portion of the gear teeth 53 and the valleys of the waveform 93 relate to the bottom of the voids between the gear teeth 53. The waveform 95 of FIG. 16 depicts one of the second derivative signals from the Hall-effect devices 12-~when used to sense the transmission gear 52 of FIG. 3. The other second derivative signal is similar but of opposite polarity.

Figure 11:
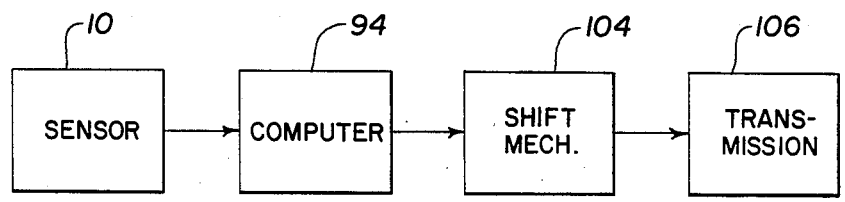
FIG. 11 is a simplified block diagram showing the present invention as utilized in the transmission system of a motor vehicle.

With reference to FIG. 11, a typical use of the Hall-effect apparatus 10 in conjunction with a transmission in a motor vehicle is disclosed. The Hall-effect apparatus 10 is positioned in and through the wall of the transmission case such as to sense the position of the gear teeth 53. The digital output signal from the Hall-effect apparatus 10 representing position is sent to the vehicle computer 94 which then computes the velocity of the gear 52. When the predetermined velocity for the gear 52 is reached, the computer 94 sends a signal to the shift mechanism 104 to cause the shift mechanism 104 to shift the transmission 106 to the next level which could be either up or down depending upon whether the vehicle was accelerating or decelerating.

Figure 12:
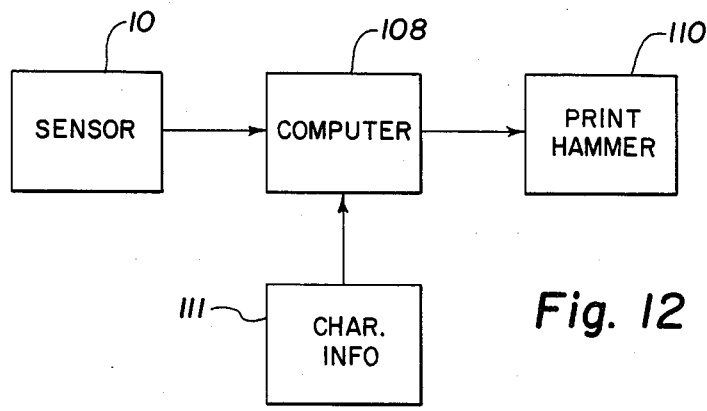
FIG. 12 is a simplified block diagram showing the present invention as utilized in a printer mechanism.

With reference to FIG. 12, a typical use of the Hall-effect apparatus 10 in a band-printer is disclosed. As the name band-printer implies, the characters to be printed are formed on or into a metal band which is rotated past a print station at very high speed. The firing of the print hammer is timed such that the print hammer and the desired character to be printed arrive at the print station at the same time. It is therefore necessary to know where the characters are located relative to the print station. The character band is formed of a ferromagnetic material with a notch or notches or a bump or bumps positioned at predetermined positions along the closed band. The Hall-effect apparatus 10, such as disclosed in FIG. 1, is operatively positioned with respect to the character band of the printer to sense the change in magnetic field as caused by the passing of the bump or the notch, whichever is incorporated into the character band. The output of the Hall-effect apparatus 10 is transmitted to the computer 108 in the printer so the computer will be able to determine the position of the characters. The desired character information 111 for printing is also supplied to the computer 108 from another computer, a data bank, word processor, etc. Computer 108 calculates when the printer hammer 110 must be fired in order to print the desire character and transmits a firing pulse to the printer hammer 110 to cause the desired character to be printed. Because of the configuration and relative position of the various elements in this particular application, it is possible to use only the first time derivative signals from the Hall-effect devices to determine the position of the rotating character band. The first time derivative signals are obtained from the outputs of only two of the Hall-effect devices.

Figure 13:
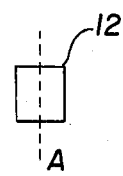
FIG. 13 is a simplified plan view showing the relative spacing of the Hall-effect devices of the present invention.
Figure 13:
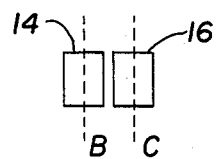
Figure 13:
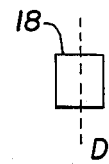

With reference to FIG. 13, the relative spacing between the centerlines of the Hall-effect devices 12-18 are disclosed. The centerline of the Hall-effect devices 12-~are shown as A, B, C and D, respectively. The centerline (B and C) of Hall-effect devices 14 and 16 are positioned approximately 6 mils apart. To provide the maximum value of signal level output from the Hall-effect devices 12-18, the centerline spacings between Hall-effect devices 12 and 18 depends upon the particular sensing application. For example, with reference to FIGS. 9 and 14, the centerlines A and D of Hall-effect devices 12 and 18 are positioned as shown in FIG. 14 to obtain the maximum output signal, while maintaining good resolution. If the distance between centerlines A and D is increased, the output signal level remains the same but the resolution decreases. If the distance between centerlines A and D is decreased, the level of the output signal decreases and the resolution increases. For the maximum signal output of this disclosed embodiment, centerlines A and D of Hall-Effect devices 12 and 18 are positioned approximately 100 mils apart.

With reference to FIG. 15, the centerline spacings between Hall-effect devices 12–~ for the sensing application of the transmission gear 52 is disclosed. The centerlines (B and C) of Hall-effect devices 14 and 16 are positioned approximately 6 mils apart. Centerlines A and D, as shown in FIG. 15, are positioned for maximum signal output from Hall-effect devices 12-18. If the distance between centerlines A and D is increased, the output signal level will decrease and the resolution will decrease. If the distance between centerlines A and D is decreased, the output signal level will decrease and the resolution will increase.

With reference to FIGS. 12 and 14, the output of the Hall-effect apparatus 10, when used in the band printer application with a bump on the band, will be similar to FIG. 14. There is a difference in the spacing between centerlines A and D with the spacing being about 30 mils.

Figure 4A:
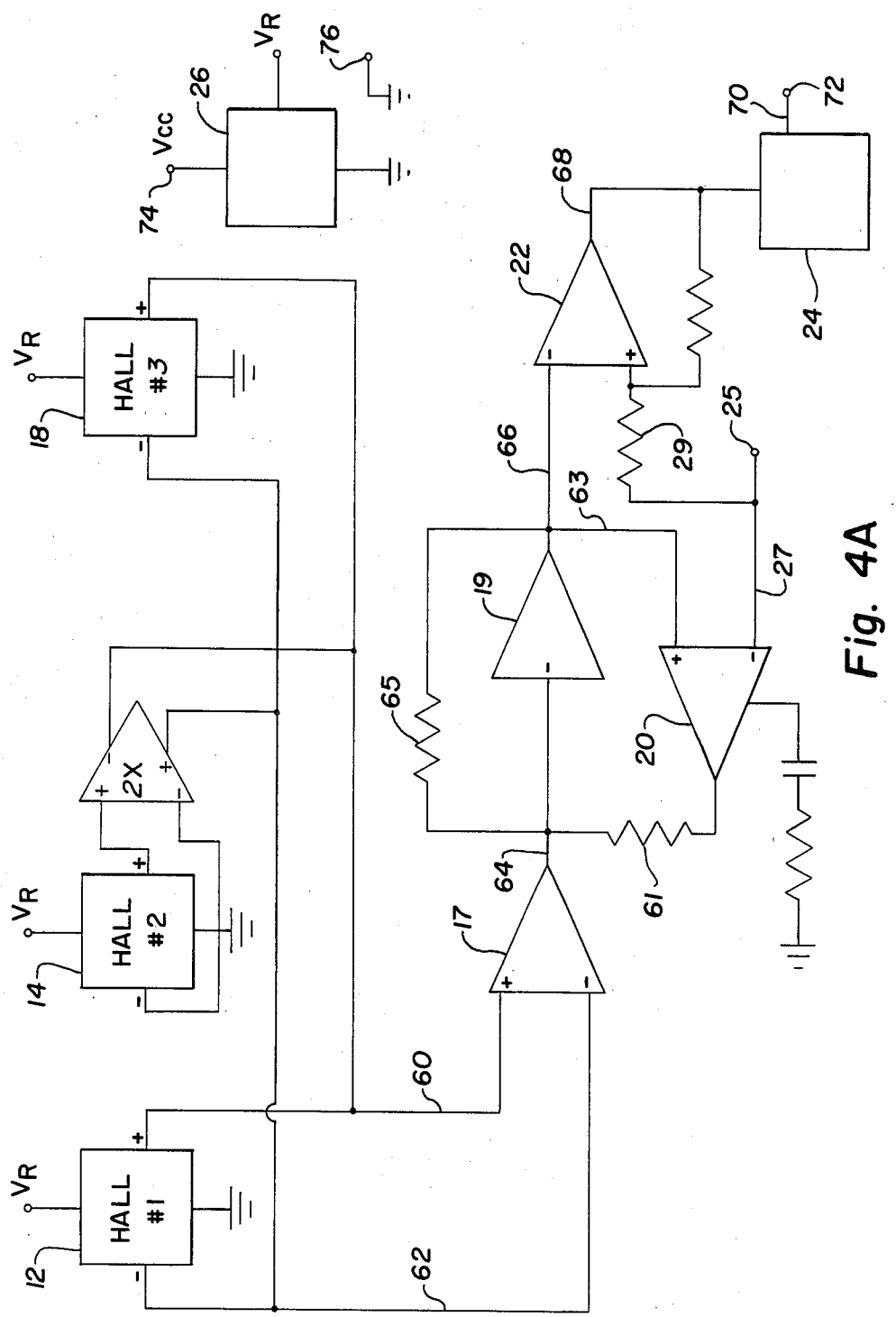
FIG. 4A is a simplified schematic of the present invention illustrating the use of three sensors.

It will be appreciated that for different applications the spacing between the centerlines of Hall-effect devices 12 and 18 will change in order to obtain the maximum signal level out of Hall-effect devices 12-18. The distance between Hall-effect devices 12 and 18 may vary from 18 mils to 200 mils depending upon the application. Hall-effect devices 14 and 16 will be essentially centered between Hall-effect devices 12 and 18 and will be about 6 mils apart. It will also be appreciated that Hall-effect devices 14 and 16 may be replaced by a single Hall-effect device as shown in FIG. 4A which is positioned midway between Hall-effect devices 12 and 18 and whose output signal is doubled by amplifier means prior to being combined with the outputs of Hall-effect devices 12 and 18.

Figure 17:
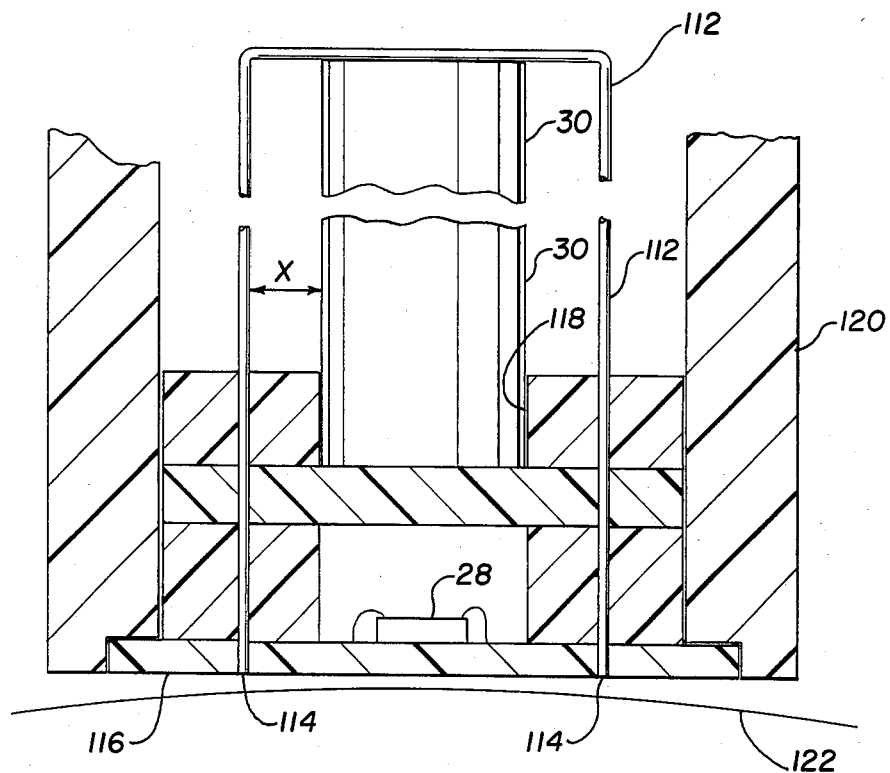
FIG. 17 is a simplified side elevational view, in section, of one embodiment of packaging of the present invention.

With reference to FIG. 17, an exemplary sandwich-type packaging configuration is disclosed which includes a magnetic concentrator 112 to further enchance the operation of the Hall-effect apparatus 10. The magnetic concentrator 112 comprises a wire or bar of ferromagnetic material which lies on the longitudinal centerline of bar magnet 30 and whose ends 114 protrude through board 116. Bar magnet 30 is positioned in cavity 118 directly above chip 28 which contains the Hall-effect apparatus 10. Cover 120 covers and protects the elements therewithin. For maximum efficiency, the concentrator 112 should be positioned a distance x from the bar magnet with the distance x being approximately equal to twice the distance between chip 28 and arc or periphery 112 described by the member to be sensed. It will be appreciated that in some applications the efficiency of operation may be enchanced by positioning the ends 114 of concentrator 112 the correct distance apart. For example, if the disclosed packaged configuration was employed to sense the position of transmission gear 52, end 114 would be positioned a distance apart such that when a gear tooth 53 was positioned under chip 28 an end 114 would be positioned above the adjoining gear tooth 53 on each side of the gear tooth 53 positioned under chip 28.

It will be appreciated that the Hall-effect apparatus 10 will work equally well for position sensing for the linear displacement of an object as it does for sensing the rotational displacement. For example, the Hall-effect apparatus 10 could be used to sense and indicate the position of predetermined sections (bumps) in the character print band of a band printer. The resulting position information would be used to fire the print hammer at the correct time to print a predetermined character. There are essentially no limitations on the Hall-effect apparatus 10 regarding the speed of the object to be sensed except the mechanical limitation on the moving object itself.

Figure 18:
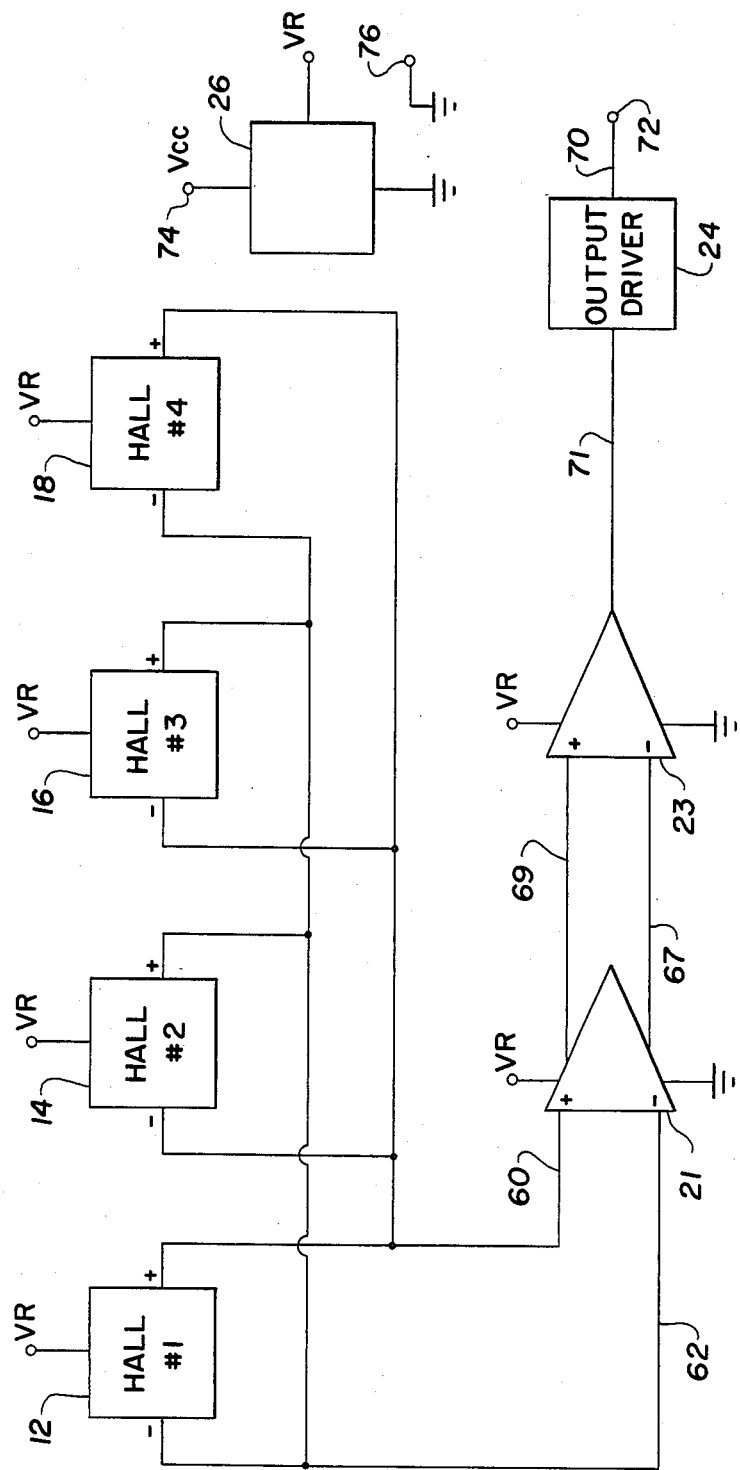
FIG. 18 is a simplified schematic of an alternate embodiment of the present invention.

With reference to FIG. 18, an alternative embodiment (a d-c coupled version) of the Hall-effect apparatus 10 is disclosed. The alignment, spacing and connections or hookup of the Hall-effect devices 12-18 are the same as for the embodiment disclosed in FIG. 4. The resultant output voltages from the plus and minus terminals of the devices 12-18, as shown in FIG. 18, are applied as inputs to differential amplifier 21 via leads 60 and 62. The output signals of differential amplifier 21 are input to a Schmitt trigger comparator 23 via leads 67 and 69. Comparator 23 is really detecting the zero crossing of the second time derivative signal input and the analog-to-digital conversion occurs in comparator 23. The digital output signal 78 from comparator 23 is depicted in FIG. 8 and is input to output driver 24 via lead 71. Output driver 24 amplifies the input signal and provides the amplifid signal to output terminal 72 for further distribution and use. The digital output 78 provides a reference point or location with respect to the edge of the means for providing a change in the magnetic field and the reference point will not change for a given application.

Thus it is apparent that there has been provided, in accordance with this invention, Hall-effect position sensor apparatus that substantially incorporates the advantages set forth above. Although the present invention has been described in conjunction with specific forms thereof, it is evident that many alternatives, modifications and variations will be apparent to those skilled in the art in light of the foregoing disclosure. Accordingly, this description is to be construed as illustrative only and is for the purpose of teaching those skilled in the art the manner of carrying out the invention. It is understood that the forms of the invention herewith shown and described are to be taken as the presently preferred embodiments. Various changes may be made in the shape, size and arrangements of parts. For example, equivalent elements may be substituted for those illustrated and described herein, parts may be reversed, and certain features of the invention may be utilized independently of the use of other features of the invention. It will be appreciated that the various modifications, alternatives, etc., may be made without departing from the spirit and scope of the invention as defined in the appended claims.

We claim:

1. For use in determining the position of an object that is movable along a displacement path and has associated with it a magnetic field that varies cyclically in strength along the displacement path, apparatus for sensing the second derivative of the strength of the magnetic field with respect to displacement along the path, the apparatus comprising:

first, second, third and fourth magnetic field sensors respectively located at four consecutive points along said path, wherein each sensor produces an electrical signal proportional to the magnetic field strength at its location, and the spacing between the consecutive points is selected to be small in relation to the distance corresponding to the maximum cyclic change in magnetic field strength along the displacement path, and to provide a measurement of at least two adjacent increments of change in magnetic field strength along said path;

first, second, third and fourth sensor circuits, connected to the first, second, third and fourth sensors, for producing first, second, third and fourth output signals proportional to the electrical signals from the first, second, third and fourth sensors, respectively, such that, when said magnetic field is the same at the locations of all four sensors, the first and fourth output signals have one polarity and the second and third signals have the opposite polarity;

a summing circuit for producing a sum signal proportional to the algebraic sum of the instantaneous values of the four output signals, whereby the sum signal represents the instantaneous value of the second derivative of the magnetic field strength with respect to displacement along said path.

2. Apparatus according to claim 1, wherein the distance between the first and second sensors equals the distance between the third and fourth sensors.

3. Apparatus according to claim 2, wherein the distance between the first and second sensors is substantially greater than the distance between the second and third sensors.

4. Apparatus according to claim 1, wherein each of the sensors is a Hall-effect device.

5. Apparatus according to claim 1, further comprising a zero-crossing detector circuit for detecting when the value of the sum signal equals zero.

6. Apparatus according to claim 1, further comprising a magnet positioned adjacent to the sensors, so as to produce a uniform magnetic field at the locations of the four sensors.

7. Apparatus according to claim 6, wherein the movable object is of magnetically permeable material and is positioned adjacent to the sensors so as to alter the magnetic fields at the locations of the four sensors as a function of the position of the object.

8. Apparatus according to claim 7, wherein the moveable object is a rotatable disc having one or more alternating notches and projections on its periphery, the periphery being position adjacent to the four sensors.

9. Apparatus according to claim 8, wherein the spacing between the first sensors and the fourth sensor is substantially less than the width of any of the notches or projections on the rotatable disc.

10. For use in determining the position of an object that is movable along a displacement path and has associated with it a magnetic field that varies cyclically in strength along the displacement path, apparatus for sensing the second derivative of the strength of the magnetic field with respect to displacement along the path, the apparatus comprising:

first, second and third magnetic field sensors respectively located at three consecutive points along said path, wherein each sensor produces an electrical signal proportional to the magnetic field strength at its location, and the spacing between the consecutive points is selected to be small in relation to the distance corresponding to the maximum cyclic change in magnetic field strength along the displacement path, and to provide a measurement of at least two adjacent increments of change in magnetic field strength along said path;

first, second and third sensor circuits, connected to the first, second and third sensors, for producing first, second and third output signals proportional to the electrical signals from the first, second and third sensors, respectively, such that, when said magnetic field is the same at the locations of all three sensors, the first and third output signals have the same magnitude and polarity and twice the magnitude;

a summing circuit for producing a sum signal proportional to the algebraic sum of the instantaneous values of the three output signals, whereby the sum signal represents the instantaneous value of the second derivative of the magnetic field strength with respect to displacement along said path.

11. Apparatus according to claim 10, wherein each of the sensors is a Hall-effect device.

12. Apparatus according to claim 10, wherein the second sensor is equidistant between the first and third sensors.

13. Apparatus according to claim 10, further comprising a zero-crossing detector circuit for detecting when the value of the sum signal equals zero.

14. Apparatus according to claim 10, further comprising a magnet positioned adjacent to the sensors, so as to produce a uniform magnetic field at the locations of the three sensors.

15. Apparatus according to claim 14, wherein the movable object is of magnetically permeable material and is positioned adjacent to the sensors so as to alter the magnetic fields at the locations of the three sensors as a function of the position of the object.

16. Apparatus according to claim 15, wherein the moveable object is a rotatable disc having one or more alternating notches and projections on its periphery, the periphery being positioned adjacent to the three sensors.

17. Apparatus according to claim 16, wherein the spacing between the first sensor and the third sensor is substantially less than the width of any of the notches or projections on the rotatable disc.

18. For use in determining the position of an object that is movable along a displacement path and has associated with it a magnetic field that varies in strength along the displacement path, apparatus for sensing the second derivative of the strength of the magnetic field with respect to displacement along the path, the apparatus comprising:

first, second, third and fourth magnetic field sensors respectively located at four consecutive points along said path, wherein each sensor produces an electrical signal proportional to the magnetic field strength at its location, and the spacing between the consecutive points is selected to be small in relation to the distances through which the object can move along the displacement path, and to provide a measurement of at least two adjacent increments of change in magnetic field strength along said path;

first, second, third and fourth sensor circuits, connected to the first, second, third and fourth sensors, for producing first, second, third and fourth output signals proportional to the electrical signals from the first, second, third and fourth sensors, respectively, such that, when said magnetic field is the same at the locations of all four sensors, the first and fourth output signals have one polarity and the second and third signals have the opposite polarity;

a summing circuit for producing a sum signal proportional to the algebraic sum of the instantaneous values of the four output signals, whereby the sum signal represents the instantaneous value of the second derivative of the magnetic field strength with respect to displacement along said path; and an amplifier circuit connected to receive the sum signal as an input, and having an overall transfer function that suppresses signal components below a selected frequency.

19. Apparatus according to claim 18, wherein the distance between the first and second sensors equals the distance between the third and fourth sensors.

20. Apparatus according to claim 19, wherein the distance between the first and second sensors is substantially greater than the distance between the second and third sensors.

21. Apparatus according to claim 18, wherein each of the sensors is a Hall-effect device.

22. Apparatus according to claim 18, further comprising a zero-crossing detector circuit for detecting when the value of the sum signal equals zero.

23. Apparatus according to claim 18, further comprising a magnet positioned adjacent to the sensors so as to produce a uniform magnetic field at the locations of the four sensors.

24. Apparatus according to claim 23, wherein the movable object is of magnetically permeable material and is positioned adjacent to the sensors so as to alter the magnetic fields at the locations of the four sensors as a function of the position of the object.

25. Apparatus according to claim 24, wherein the movable object is a rotatable disc having one or more alternating notches and projections on its periphery, the periphery being positioned adjacent to the four sensors.

26. Apparatus according to claim 25, wherein the spacing between the first sensor and the fourth sensor is substantially less than the width of any of the notches or projections on the rotatable disc.

27. Apparatus according to claim 18, wherein the amplifier circuit includes:
 a low-pass feedback amplifier for suppressing low-frequency and direct-current signal components, and thereby eliminating errors caused by direct-current offsets and relatively slowly varying circuit conditions.

28. Apparatus according to claim 27, wherein:
 the amplifier circuit further includes a transconductance amplifier connected to receive the sum signal from the summing circuit, and a transimpedance amplifier connected to receive the output of the transconductance amplifier; and
 the low-pass feedback amplifier is connected between the output and the input of the transimpedance amplifier.

29. For use in determining the position of an object that is movable along a displacement path and has associated with it a magnetic field that varies in strength along the displacement path, apparatus for sensing the second derivative of the strength of the magnetic field with respect to displacement along the path, the apparatus comprising:
 first, second and third magnetic field sensors respectively located at three consecutive points along said path, wherein each sensor produces an electrical signal proportional to the magnetic field strength at its location, and the spacing between the consecutive points is selected to be small in relation to the distances through which the object can move along the displacement path, and to provide a measurement of at least two adjacent increments of change in magnetic field strength along said path;
 first, second and third sensor circuits, connected to the first, second and third sensors, for producing first, second and third output signals proportional to the electrical signals from the first, second and third sensors, respectively, such that, when said magnetic field is the same at the locations of all three sensors, the first and third output signals have the same magnitude and polarity and the second signal has the opposite polarity and twice the magnitude;
 a summing circuit for producing a sum signal proportional to the algebraic sum of the instantaneous values of the three output signals, whereby the sum signal represents the instantaneous value of the second derivative of the magnetic field strength with respect to displacement along said path; and
 an amplifier circuit connected to receive the sum signal as an input, and including a feedback circuit for suppressing signal components below a selected frequency.

30. Apparatus according to claim 29, wherein each of the sensors is a Hall-effect device.

31. Apparatus according to claim 29, wherein the second sensor is equidistant between the first and third sensors.

32. Apparatus according to claim 29, further comprising a zero-crossing detector circuit for detecting when the value of the sum signal equals zero.

33. Apparatus according to claim 29, further comprising a magnet positioned adjacent to the sensors so as to produce a uniform magnetic field at the locations of the four sensors.

34. Apparatus according to claim 33, wherein the movable object is of magnetically permeable material and is positioned adjacent to the sensors so as to alter the magnetic fields at the locations of the three sensors as a function of the position of the object.

35. Apparatus according to claim 34, wherein the movable object is a rotatable disc having one or more alternating notches and projections on its periphery, the periphery being positioned adjacent to the three sensors.

36. Apparatus according to claim 35, wherein the spacing between the first sensor and the third sensor is substantially less than the width of any of the notches or projections on the rotatable disc.

37. Apparatus according to claim 29, wherein the amplifier circuit includes:
 a low-pass feedback amplifier for suppressing low-frequency and direct-current signal components, and thereby eliminating errors caused by direct-current offsets and relatively slowly varying circuit conditions.

38. Apparatus according to claim 37, wherein:
 the amplifier circuit further includes a transconductance amplifier connected to receive the sum signal from the summing circuit, and a transimpedance amplifier connected to receive the output of the transconductance amplifier; and
 the low-pass feedback amplifier is connected between the output and the input of the transimpedance amplifier.

39. For use in determining the position of an object that is movable along a displacement path and has associated with it a magnetic field that varies in strength along the displacement path, apparatus for sensing the strength of the magnetic field along the path, the apparatus comprising:
- a plurality of Hall-effect magnetic field sensors located at consecutive points along said path, wherein each sensor produces an electrical signal proportional to the magnetic field strength at its location, and the spacing between the consecutive points is selected to be small in relation to the distances through which the object can move along the displacement path;
- a plurality of sensor circuits connected to the Hall-effect sensors, for producing output signals proportional to the electrical signals from the sensors;
- circuit means for combining the instantaneous values of the output signals according to an algebraic function that generates the second derivative of said electrical signal relative to the displacement of the object being sensed; and
- an amplifier circuit connected to receive the sum signal as an input, and having an overall transfer function that suppresses signal components below a selected frequency.

40. Apparatus according to claim 39, wherein the amplifier circuit includes:
- a low-pass feedback amplifier for suppressing low-frequency and direct-current signal components, and thereby eliminating errors caused by direct-current offsets and relatively slowing varying circuit conditions.

41. Apparatus according to claim 40, wherein:
- the amplifier circuit further includes a transconductance amplifier connected to receive the sum signal from the summing circuit, and a transimpedance amplifier connected to receive the output of the transconductance amplifier; and
- the low-pass feedback amplifier is connected between the output and the input of the transimpedance amplifier.

* * * * *